Figure 1:
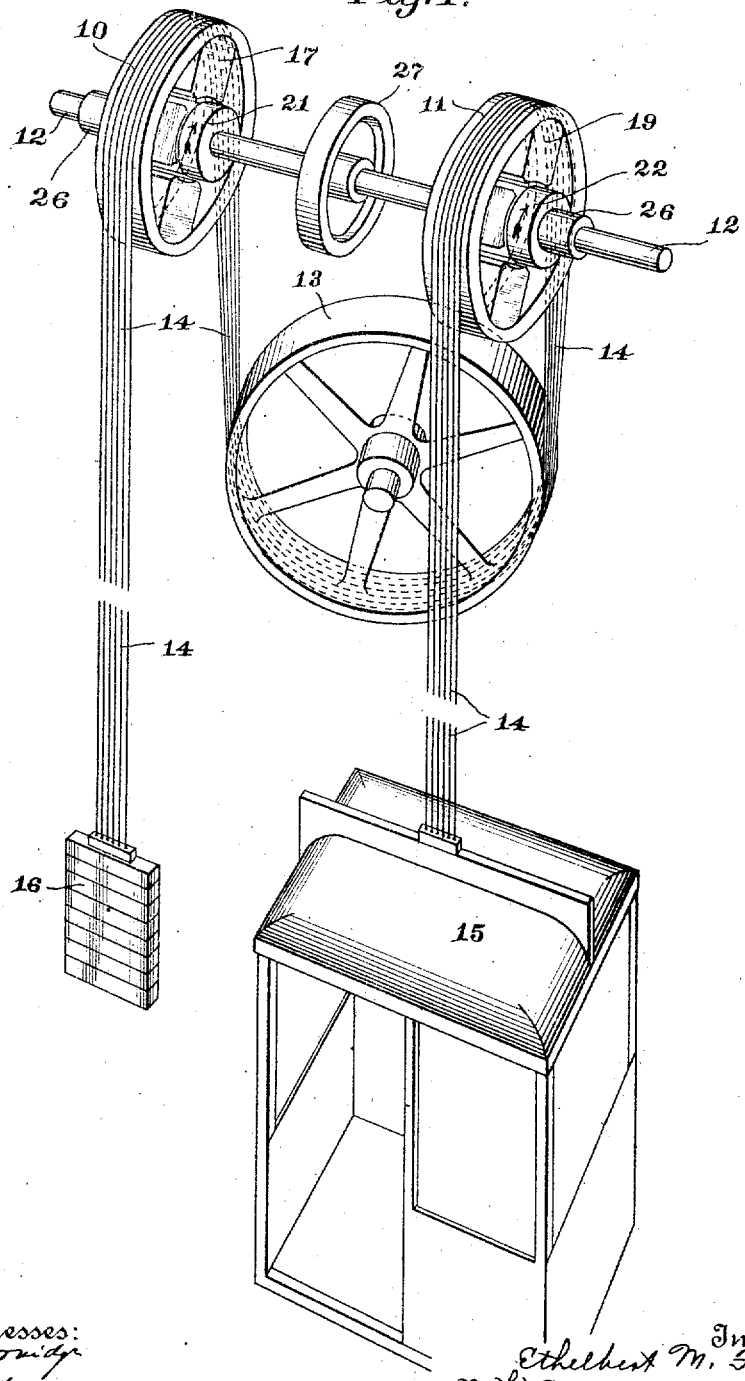

E. M. FRASER.

ELECTRIC ELEVATOR SYSTEM.

APPLICATION FILED APR. 28, 1914.

Reissued Oct. 13, 1914.

13,806.

2 SHEETS—SHEET 1.

Witnesses:
H. T. Horridge
J. Montgomery

Inventor
Ethelbert M. Fraser
By his Attorneys
Kiddle & Margeson

NORRIS PETERS, INC., LITHO., WASHINGTON, D. C.

E. M. FRASER.

ELECTRIC ELEVATOR SYSTEM.

APPLICATION FILED APR. 28, 1914.

Reissued Oct. 13, 1914.

13,806.

2 SHEETS—SHEET 2.

Witnesses:
H. T. Hornidge
J. Montgomery

Ethelbert M. Fraser
Inventor

By his Attorneys
Kiddle & Marason

NORRIS PETERS, INC., LITHO WASHINGTON D

UNITED STATES PATENT OFFICE.

ETHELBERT M. FRASER, OF YONKERS, NEW YORK, ASSIGNOR, BY MESNE ASSIGNMENTS, TO GENERAL ELEVATOR COMPANY, OF JERSEY CITY, NEW JERSEY, A CORPORATION OF NEW JERSEY.

ELECTRIC ELEVATOR SYSTEM.

13,806. Specification of Reissued Letters Patent. Reissued Oct. 13, 1914.

Original No. 1,093,583, dated April 14, 1914, Serial No. 711,957. Application for reissue filed April 28, 1914. Serial No. 835,580.

*To all whom it may concern:*

Be it known that I, ETHELBERT M. FRASER, a citizen of the Dominion of Canada, residing at Yonkers, county of Westchester, and State of New York, have invented a new and useful Improvement in Electric Elevator Systems, of which the following is a specification.

The invention relates to an electric elevator system or hoisting apparatus of the traction type.

Broadly speaking, the invention is directed to such a system in which there are provided two electric machines, each having two electrically and magnetically coöperating rotors. In each of said machines one of said rotors includes a field magnet and the other rotor an armature. When the system is in operation to move a load, one of the rotors of one machine is mechanically connected or coupled to one of the rotors of the other machine, the other two rotors of said machines being connected together as by power-transmission means. The machines are furthermore so constructed and the parts so arranged that the rotors of one machine will rotate in the same direction relative to each other and the rotors of the other machine will rotate in directions the reverse of each other. In other words, when the system operates to move a load, one of the electric machines will operate as a motor and the other of the electric machines will operate as a dynamo, and vice versa. That is to say, when the system is operated three of the rotors will rotate in the same direction and the fourth rotor will rotate in a direction the reverse of the other three.

In the preferred form of system or apparatus, all of the rotors rotate about the same axis or about parallel axes, and one rotor of each machine is provided with a sheave or driving member, these driving members being engaged by flexible wire cables that engage an idler pulley or sheave when passing from one of the driving members to the other.

In one embodiment of my invention, my improved electric elevator system comprises two electric machines, one of which may be termed a motor and the other a dynamo, dependent upon the manner in which it is being used at any particular time. These electric machines are preferably shunt-wound, and the shafts of the rotors, commonly designated as armatures, are in alinement and coupled rigidly together so as to revolve in unison in the same direction. The rotors, commonly designated as field structures, are mounted so as to rotate either forward or backward but in directions the reverse of each other. Each of these field structures is provided with a driving pulley or sheave. The system also comprises an idler pulley or sheave and a flexible connector or cable which passes from the car over one of said driving pulleys or sheaves and engages said idler pulley or sheave, thence over the other driving pulley or sheave to the counterweight.

One of the objects of my invention is to provide an electric elevator system, comprising two electric motors or dynamos whose armatures are mechanically connected together and having rotatable field magnets, in which the elevator car is controlled by varying field strength of either or both motors.

Another object is to provide an electric elevator system in which the power-operating instrumentalities will oppose each other, thereby constituting an electric lock or brake to control the movement of the car and to hold the car from descending or ascending.

Another object is to provide an electric elevator system or hoisting apparatus, comprising a motor and a generator each having two rotors, one of which includes a field and the other an armature, said rotors being so arranged and constructed that three of said rotors will rotate in the same direction while the fourth rotor will rotate in a direction the reverse of the other three, and in which system the power-transmitting means, namely, a flexible connector, is driven by a pulley or sheave forming a part of or secured to one of the rotors of the motor and to a pulley or sheave forming a part of or secured to one of the rotors of the generator. The motor and generator operate simultaneously, the one as a motor and the other as a generator, and also operate interchangeably as such, thus constituting a motor-generator set.

Another object is to provide an electric elevator system in which there are no sudden rushes of current from or into the line when the car is started or stopped.

With the above and other objects in view, my invention consists of the construction, arrangements and combinations of parts hereinafter described and claimed.

An electric elevator or hoisting system embodying the features of my invention is illustrated in the accompanying drawings, forming a part of this specification, in which—

Figure 2:
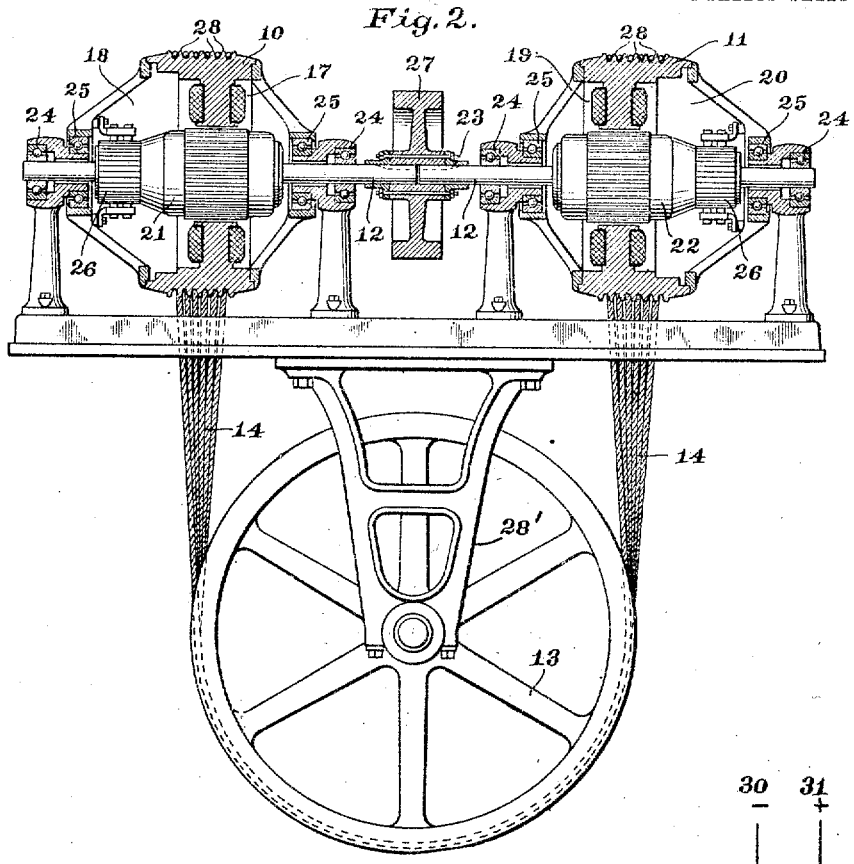
Figure 3:
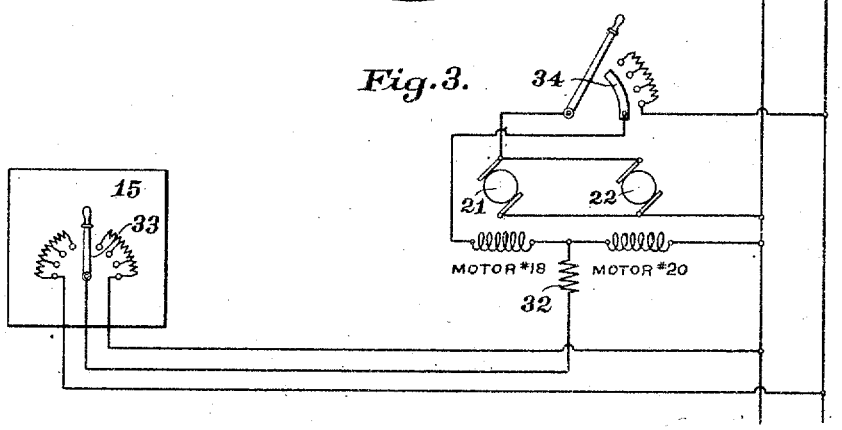

Figure 1 is a view illustrating diagrammatically the arrangement of the independently-operated pulleys or sheaves, the idler pulley or sheave, and the power-transmitting means connected to the car and counterweight. Fig. 2 is a view partly in section of the operating motors, the idler pulley or sheave, and the power-transmitting means. Fig. 3 is a wiring diagram.

In the drawings, similar figures of reference refer to similar parts throughout the several views.

As shown in Fig. 1, my improved electric elevator or hoisting system comprises the two independently-operated pulleys or sheaves 10 and 11 preferably arranged to rotate about the same axis or shaft 12, the idler pulley or sheave 13, and the power-transmitting means 14. In the embodiment of my invention as shown, the power-transmitting means 14 are connected to the car 15, and the counterweight 16. Being merely diagrammatic, no bearings for the different rotating elements are shown in Fig. 1, this feature being shown in detail in Fig. 2.

Referring to Fig. 2, the pulley or sheave 10 forms a part of or is secured to the field structure 17 of the motor 18, and the pulley or sheave 11 forms a part of or is secured to the field structure 19 of the motor 20. The motors 18 and 20, which are of the standard shunt-wound type, comprise the field structures 17, 19, the armatures 21, 22, and the commutators 26, 26, respectively. The armature shafts 12, 12 are preferably in alinement and rigidly secured together by the coupling 23, or, a unitary armature shaft may be used for the two rotors. The armature shafts 12, 12 are suitably supported in bearings 24, 24 to permit of the shafts and armatures 21, 22 revolving in unison. The field structures 17, 19, are also suitably supported in bearings 25, 25 to permit of the field structures rotating independently of each other and of the armatures in either direction. If desired, a fly-wheel 27 may be mounted on the shaft of the armatures for the purpose of storing up and giving out power, thereby causing the flow of current from the main source of supply to be more uniform and reducing the sudden rushes of current when starting or stopping the elevator. The idler pulley or sheave 13 is suitably supported in the hanger 28′ and arranged so as to rotate freely in either direction. The power-transmitting means preferably comprise a plurality of iron hoisting ropes 14 which engage grooves 28, 28 in the pulleys or sheaves 10, 11 and 13, the ropes being connected at one end to the car 15 and at the other end to the counterweight 16. As will be shown hereinafter, it is not necessary to provide a friction brake to control the movement of the car, as the two motors under certain conditions constitute an electric locking device to hold the car from ascending or descending. In case, however, there should be a cessation in the current supply, means are provided for holding the field structures of the motors from rotating thereby preventing the car from ascending or descending, or if preferred, means for gripping the hoisting ropes may be used.

As shown in Fig. 3, the field magnets of the motors 18 and 20 are electrically connected up in series and connected across the line or power mains 30 and 31, while the armatures 21, 22 are in multiple and connected across the line. The system is also provided with the usual armature starting rheostat 34, a suitable fixed resistance 32 in the field circuits, and a plain field rheostat 33 to vary the field strength of either motor. In the embodiment of my invention as illustrated the rheostat 33 is placed in the elevator car.

The method of operation is as follows: The armatures are started up and rotate clockwise as indicated by the arrows (Fig. 1) at say 500 revolutions per minute, while the field structures remain stationary. For the purpose of illustration, the field magnet is considered to be rotating in the plus direction when rotating opposite to its armature, and in the minus direction when it rotates in the same direction as its armature, the algebraic sum of the speeds of the armature and field magnet being the effective speed of the armature. If the field magnet does not rotate, the speed of the armature will be the effective speed. If there is a load on the car, and the weight of the car and load is in excess of that of the counterweight, the natural tendency would be for the car and load to descend, but by so doing it would rotate the field structure 19 in the opposite direction to its armature 22, in which event motor 20 would act as a dynamo, and a current would be generated and sent into the line. At the same time, the field structure 17 would be rotated in the same direction as its armature 21, the effect being to make this part of the apparatus act as a motor and take current from the line. The ultimate effect of the armature 22 sending current into the line and the armature 21 taking current from the line is to prevent the field structures 17, 19, from rotating, thereby holding the car and load from descending. That is, the arrangement of having both armatures connected to the line and the field magnets of the two motors of the same strength constitutes an electric locking device.

When it is desired to raise the car and load (it is assumed that the armatures are running at the maximum speed of 500 revolutions per minute when the car is at rest), field strength of motor 20 is strengthened sufficiently, for example, to make the effective speed 400 revolutions per minute. As the armature shafts of the two motors are connected together, in order to permit armature 22 to slow up it would be necessary to lower the speed of armature 21. As the field strength of motor 18 has not been changed, armature 21 opposes the slowing up effect of armature 22. Armature 20 not being able to slow up and field structure 19 being free to rotate, the latter will turn in the same direction as the armature or in a minus direction, the effect being the same as if the armature 20 were slowed up.

As the field structures 17, 19, are connected by the hoisting ropes 14, one cannot rotate without the other, and as field structure 19 rotates in the minus direction the field structure 17 will rotate at the same speed in the plus direction. The field strength of motor 18 remaining the same and field structure 17 rotating in the plus direction, armature 21 will slow up the same number of revolutions as the field structure 17 turns in the plus direction. The final effect of strengthening the field magnets of motor 20 to get an effective armature speed of 400 revolutions per minute and keeping the field strength of motor 18 constant to get an effective armature speed of 500 revolutions per minute is to cause the armatures 21, 22 to slow up to 450 revolutions per minute, the field structure 19 to rotate 50 revolutions per minute in the minus direction and the field structure 17 to rotate 50 revolutions per minute in the plus direction.

Whenever it is desired to stop the elevator car, the field strength of motor 20 is weakened to the original density or its field strength is made the same as that of motor 18, thereby preventing the field structures from rotating and effectually locking or braking the car.

In order to lower the car, the field strength of motor 18 may be increased and the field strength of motor 20 is maintained at the normal density or decreased, the action being the same as above outlined when the car is raised except that the direction of rotation of the field structures 17, 19, is reversed.

From the foregoing it will be seen that the armatures and fly-wheel are slowed up when the car is started in motion, and they are speeded up when the car is stopped. This is a decidedly beneficial effect as the momentum of the armatures and fly-wheel is used to help start the car and counterweight from a state of rest, and it is taken up in increasing the speed of the armatures and fly-wheel. The ultimate effect is to prevent sudden rushes of current from or into the line when starting or stopping the car. These sudden rushes of current have been one of the greatest defects of electric elevators, especially where a number of elevators have been operated *in banc* from an isolated plant.

As it is possible to operate the system with armatures running at a constant speed, the normal speed will be the average speed, and as the field strength of one motor is weakened the field strength of the other motor is increased in exact proportion.

The elevator system has been described as comprising two independently operated pulleys or sheaves 10 and 11. It will be apparent from the foregoing and also from the drawings that this expression is intended to bring out the fact that these pulleys or sheaves operate independently of the armatures, speaking in a mechanical sense. The pulleys 10 and 11, however, are connected to each other by the flexible connector 14 that is connected to the car 15 and to the counterweight 16, said connector transmitting the reactions between the coupled rotors and their respective coöperating rotors to the car.

It will furthermore be noted that the motors 18 and 20 constitute two electric machines each having two rotors that magnetically and electrically coöperate. In the embodiment of the invention, as herein illustrated, in each machine one rotor encircles the other rotor, one of these rotors including an armature and the other a field.

As will be observed from Fig. 2, and as above described, the armatures, which are the inner rotors, are mechanically connected by a coupling which is one form of a mechanical connection for causing said rotors to revolve in a certain timed relation with respect to each other. The outer rotors also being connected by the flexible connector, are compelled to rotate in a certain timed relation with respect to each other, and due to the mechanical connections between the various rotors, the rotors of one machine must rotate in the same direction when the rotors of the other machine rotate in directions which are the reverse of each other. In other words, in the embodiment of the invention as shown, three of the rotors rotate in the same direction and the fourth rotor rotates in a direction the reverse of the other three.

From what has preceded and also from an inspection of the drawings, it will be manifest that when the system is in operation the inner rotors or armatures 21 and 22 are continuously rotating regardless of whether or not the car is being raised or lowered or standing still, and that the outer rotor or field structures 17, 19, rotate only when the car is being moved.

It will be obvious that numerous omissions, substitutions and changes may be made in the various parts, arrangements and wiring herein shown and described without, however, departing from my invention. It is to be further understood that I do not wish to be limited to the specific features of construction and arrangement of parts, or to the specific application of my invention, herein set forth.

Having thus described my invention, what I claim as new and desire to secure by Letters Patent, is:

1. In an electric elevator system, the combination with two electric motors having rotatable armatures and field structures rotatable in opposite directions of a plurality of pulleys, two of said pulleys being secured to and driven by said field structures, and power-transmitting means engaging said pulleys.

2. In an electric elevator system, the combination with two electric motors having their armatures mechanically coupled together and their field structures rotatable in opposite directions, of means for varying the field strength of either or both of said motors, and power-transmitting means driven by said field structures.

3. In an electric elevator system, the combination with a car, of a counterweight, two electric motors having rotatable field structures and armatures, means for varying the field strength of said motors, a plurality of sheaves, two of said sheaves being operated by said field structures, and power-transmitting means connecting said car and counterweight and engaging said sheaves.

4. The method of operating an electric elevator driven by two electric motors or dynamos, having their armature shafts mechanically connected together and their field magnets rotatable in opposite directions, which consists in making the field strength of the two motors or dynamos unequal so that one motor or dynamo will always act as a motor when the other acts as a dynamo, and transmitting the reactive thrust of the armatures on the field magnets to an elevator car and counterweight.

5. The method of controlling an elevator car driven by two electric motors or dynamos, having their armature shafts mechanically connected together and their field magnets rotatable in opposite directions, which consists in varying the field strength of either or both of said motors or dynamos to control the direction of rotation of said field magnets.

6. In an electric elevator system, the combination with two electric motors having their armatures mechanically coupled together and field structures rotatable in opposite directions, of means for varying the relative speeds and direction of rotation of said field structures, and a flexible connector engaging said field structures.

7. In an electric elevator system, the combination with two electric motors having rotatable armatures and field magnets rotatable in opposite directions, of a sheave or pulley connected to the field magnets of each motor and driven thereby, an independent idler sheave or pulley, and a flexible connector engaging all of said sheaves or pulleys.

8. In an electric elevator system, the combination with two electric motors having armatures mechanically coupled together and independently rotatable field structures, of a sheave or pulley driven by each of said field structures, an independent idler sheave or pulley, a flexible connector engaging all of said sheaves or pulleys, and means for controlling the speed and direction of rotation of said field structures.

9. In an electric elevator system, the combination with two electric motors having armatures mechanically coupled together and independently rotatable field structures, of a sheave or pulley carried by each of said field structures and driven thereby, an independent idler sheave or pulley, a flexible connector engaging all of said sheaves or pulleys, and means for varying the field strength of either or both of said motors.

10. The combination with two electric motors having their armatures mechanically coupled together and their field structures rotatable in opposite directions at the same speed, of a pulley or sheave carried by each of said field structures, an independent idler sheave or pulley, a flexible connector engaging all of said pulleys or sheaves, and means for varying the speed and direction of rotation of said field structures.

11. The combination with the power mains or source of current supply, of two electric motors having rotatable field magnets electrically connected in series across the power mains, armatures electrically connected in multiple across the power mains and their armature shafts mechanically coupled together, a pulley or sheave carried by the field structure of each motor, an independent idler sheave or pulley, and power-transmitting means engaging all of said pulleys or sheaves and driven by the two first-mentioned pulleys or sheaves.

12. The combination with the power mains or source of current supply, of two electric motors having rotatable field magnets electrically connected in series across the power mains, armatures electrically connected in multiple across the power mains and their armature shafts mechanically coupled together, a pulley or sheave driven by the field magnets of each motor, an independent idler sheave or pulley, power-transmitting means engaging all of said pulleys or sheaves and driven by the two first-mentioned pulleys or sheaves, and means for varying the speed and direction of rotation of said field magnets.

13. In an electric elevator system the combination with a car, of a counterweight, two electric motors having rotatable fields and armatures, said armatures being mechanically coupled together, means for varying the field strengths of said motors, a pulley driven by each of said fields, an idler pulley, and a flexible connector connected at one end to said car and passing over one of the pulleys driven by one of said fields to said idler pulley and thence in the opposite direction over the pulley driven by the other of said fields and connected at its other end to said counterweight.

14. The method of operating an electric elevator driven by two electric motors or dynamos, having their armature shafts mechanically connected together and their field magnets rotatable in opposite directions, which consists in transmitting the reactive thrust of the armatures on the field magnets to an elevator car and counterweight and making the field strength of the two motors equal to stop the car and varying the field strength of either or both of said motors to move the car up or down.

15. In an electric elevator system, the combination with a car, of two electrically operating machines, each having two electrically and magnetically coöperating rotors, one rotor of one of said machines being connected to a rotor of the other machine, and the other two rotors being connected so that when the four rotors are coöperating to cause an actuation of the car the rotors in one machine will rotate in the same direction and the rotors in the other machine will rotate in directions the reverse of each other, and a flexible connector connected to said car engaging one rotor of each machine.

16. An elevator system comprising in combination a car, a counterweight, two electric machines each of which comprises two rotors, one of which includes a field and the other an armature, and a flexible connector between said car and counterweight and actuated by said electric machines for moving said car and counterweight, one of the rotors of one of said machines being connected to a rotor of the other machine, whereby said connected rotors will rotate in certain timed relation in respect to each other, the other rotors constituting means for driving said connector, the rotors in one machine rotating in the same direction when the rotors in the other machine rotate in directions reverse to each other when the car is being moved.

17. In an electric elevator system, the combination with a source of current supply of substantially constant voltage, of a car, two electric machines each having two rotors, one of said rotors including a field and the other rotor an armature, one of the rotors of one machine being driven by one of the rotors of the other machine, and power-transmission means connected to said car and actuated by the coöperation of the other rotors of said machines, the said machines being so arranged that the rotors of one machine rotate in the same direction relative to each other when the rotors of the other machine rotate in the opposite directions relative to each other.

18. In an electric elevator system, the combination with the power mains or source of current supply, of a car, a motor-generator set comprising two electric machines operating simultaneously the one as a motor and the other as a generator and also operating interchangeably as such, each machine having electrically and magnetically coöperating rotatable elements, one of which includes a field and the other an armature, a power-transmitting member connected to one of the rotatable elements of one of the machines, a power-transmitting member connected to one of the rotatable elements of the other of said machines, and power-transmission means between the car and said members and driven by said members, the rotors of each machine being connected to said source of current supply, the current thus supplied to the rotors providing the energy for actuating the car, one of said rotors rotating in a direction the reverse of the other three.

19. In an electric elevator system, the combination of a car, a counterweight, two electric machines each having electrically and magnetically coöperating rotors, three of which rotors rotate in the same direction and the fourth of which rotates in a direction the reverse of the other three, and power-transmitting means intermediate the car and counterweight and actuated by said machines.

20. In an electric elevator system, the combination of a car, a counterweight, two electric machines each having electrically and magnetically coöperating rotors, three of which rotors rotate in the same direction and the fourth of which rotates in a direction the reverse of the other three, power-transmitting means intermediate the car and counterweight and actuated by said machines, and electrical means for reversing one rotor of each machine.

21. In an electric elevator system, a car, and a counter-weight, power-transmitting means intermediate of said car and counterweight, two electric machines, each comprising coöperating rotors that include an armature and a field, one of the rotors of one of the machines being connected to one of the rotors of the other machine, and the other two rotors mechanically coöperating through said power-transmitting means to move the car, three of the rotors of said machines rotating in one direction when the fourth rotor rotates in the opposite direction.

22. In an electric elevator system, a car, and two electric machines, each comprising coöperating rotors that include an armature and a field, one of the rotors of one of the machines being connected to one of the rotors of the other machine, and the other two rotors mechanically coöperating to actuate the car, three of the rotors of said machines rotating in one direction when the fourth rotor rotates in the opposite direction, a flexible connector connected to said car and actuated by said mechanically coöperating rotors, and electrical means for controlling the motion of the rotors which mechanically actuate the car.

23. In an electric elevator system, the combination with a car, of a counter-weight, power-transmitting means connecting said car and counterweight, and two electric machines each having two rotors, one rotor including a field and the other an armature, the rotor of one machine being connected to the rotor of the other machine and both said connected rotors continuously rotating when the system is in operation, the other two rotors being mechanically connected by said power-transmitting means and mechanically coöperating to actuate the car, said last mentioned rotors rotating only when the car is being moved, all of said rotors being arranged so that when the car is being moved the rotors in one machine will rotate in the same direction and the rotors in the other machine will rotate in directions which are the reverse of each other.

24. In an electric elevator system, the combination with a car, of a counter-weight, power-transmitting means connected to said car and counterweight, and two electric machines, each having two rotors, one rotor including an armature and the other rotor including a field, a rotor of one electric machine being mechanically connected to a rotor of the other electric machine and both of said rotors constantly rotating when the system is in operation, the other two rotors being also mechanically connected by said power-transmitting means and rotating only when the car is being moved, the construction being such that when the car is being moved the rotors in one electric machine will rotate in the same direction and the rotors in the other electric machine will rotate in directions the reverse of each other.

In testimony whereof, I signed this specification in the presence of two witnesses.

ETHELBERT M. FRASER.

Witnesses:
EDWIN A. PACKARD,
E. L. GREENEWALD.